(12) United States Patent
Moore et al.

(10) Patent No.: US 10,983,223 B2
(45) Date of Patent: Apr. 20, 2021

(54) METHOD AND SYSTEM FOR DETERMINING A GEOGRAPHICAL LOCATION OF AN UNMANNED AERIAL VEHICLE FLOWN IN PROXIMITY TO A POWER GRID

(71) Applicant: UNITED STATES OF AMERICA AS REPRESENTED BY THE ADMINISTRATOR OF NASA, Washington, DC (US)

(72) Inventors: Andrew J. Moore, Williamsburg, VA (US); Scott B. Dorsey, Williamsburg, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 266 days.

(21) Appl. No.: 16/045,076

(22) Filed: Jul. 25, 2018

(65) Prior Publication Data

US 2019/0033467 A1 Jan. 31, 2019

Related U.S. Application Data

(60) Provisional application No. 62/536,501, filed on Jul. 25, 2017.

(51) Int. Cl.
*G05D 1/00* (2006.01)
*B64C 39/02* (2006.01)
(Continued)

(52) U.S. Cl.
CPC ............ *G01S 19/48* (2013.01); *B64C 39/024* (2013.01); *G01C 21/04* (2013.01); *G01C 21/20* (2013.01);
(Continued)

(58) Field of Classification Search
None
See application file for complete search history.

(56) References Cited

U.S. PATENT DOCUMENTS 9,037,314 B2 * 5/2015 Waite ..................... G01C 21/20
701/3
9,824,597 B2 * 11/2017 Sekelsky .............. G08G 5/0069
(Continued)

*Primary Examiner* — Adam D Tissot
*Assistant Examiner* — Laura E Linhardt
(74) *Attorney, Agent, or Firm* — M. Bruce Harper; Andrea Z. Warmbier; Helen M. Galus

(57) ABSTRACT

A method for determining geolocation of a UAV near a power grid includes detecting, via a transceiver, a carrier signal transmitted from a first grid node to identify the node's fixed geolocation. A response signal may be transmitted from a second grid node in response to the carrier signal to identify a fixed geolocation of the second grid node, or the UAV may process the carrier signal. A processor determines time-of-flight of the carrier signal, e.g., using the response signal, and derives the UAV's geolocation using the time-of-flight. Determining time-of-flight may include referencing a lookup table indexed by time-of-arrival at the transceiver of the modulated carrier and response signals. A timestamp may indicate time-of-transmission of the carrier and response signals, respectively. Deriving geolocation may include subtracting time-of-transmission of the response signal from that of the carrier signal. A system includes the processor and transceiver.

20 Claims, 2 Drawing Sheets

(51) Int. Cl.
  *H04W 8/08*  (2009.01)
  *G01S 5/02*  (2010.01)
  *G01S 19/46*  (2010.01)
  *G05D 3/00*  (2006.01)
  *G01S 19/48*  (2010.01)
  *G05D 1/02*  (2020.01)
  *G01S 19/51*  (2010.01)
  *G01C 21/20*  (2006.01)
  *G01S 5/10*  (2006.01)
  *G01S 5/14*  (2006.01)
  *G01C 21/04*  (2006.01)
  *G05D 1/10*  (2006.01)

(52) U.S. Cl.
  CPC ............... *G01S 5/10* (2013.01); *G01S 5/14* (2013.01); *G01S 19/51* (2013.01); *G05D 1/0202* (2013.01); *G05D 1/102* (2013.01); *B64C 2201/145* (2013.01)

(56) References Cited

U.S. PATENT DOCUMENTS

| | | | |
|---|---|---|---|
| 10,319,247 B2 * | 6/2019 | Bietz | A61B 8/08 |
| 10,378,902 B1 * | 8/2019 | Parodi | G05D 1/101 |
| 2015/0304612 A1 | 10/2015 | Richards et al. | |
| 2015/0351067 A1 * | 12/2015 | Taylor, Jr. | H04W 8/08 455/456.1 |
| 2017/0285032 A1 | 10/2017 | Moore | |
| 2017/0285627 A1 * | 10/2017 | Feldmann | H04W 4/025 |
| 2017/0318236 A1 | 11/2017 | Moore et al. | |

* cited by examiner

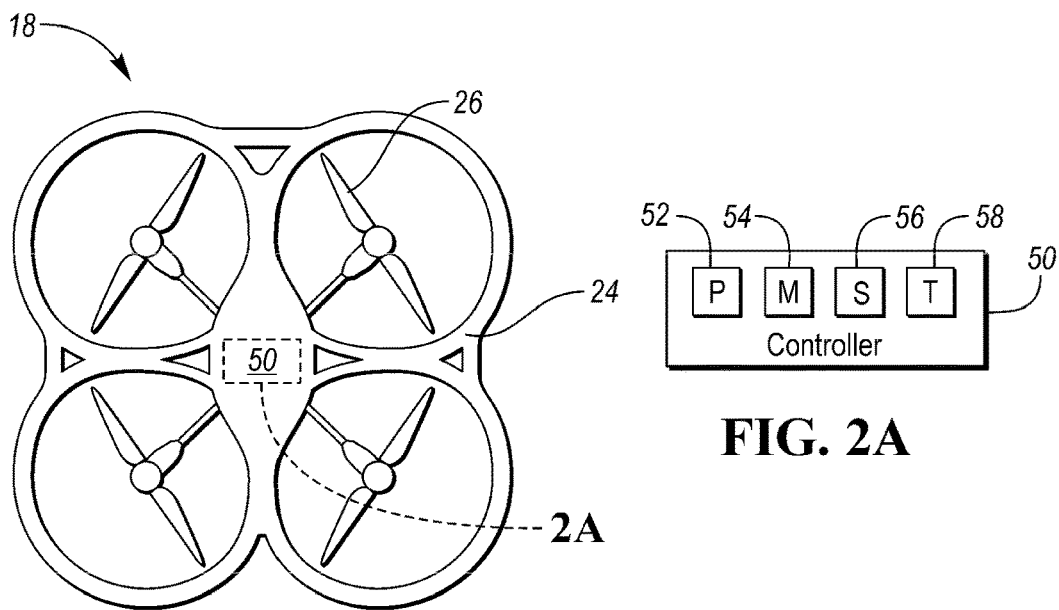
FIG. 2
FIG. 2A
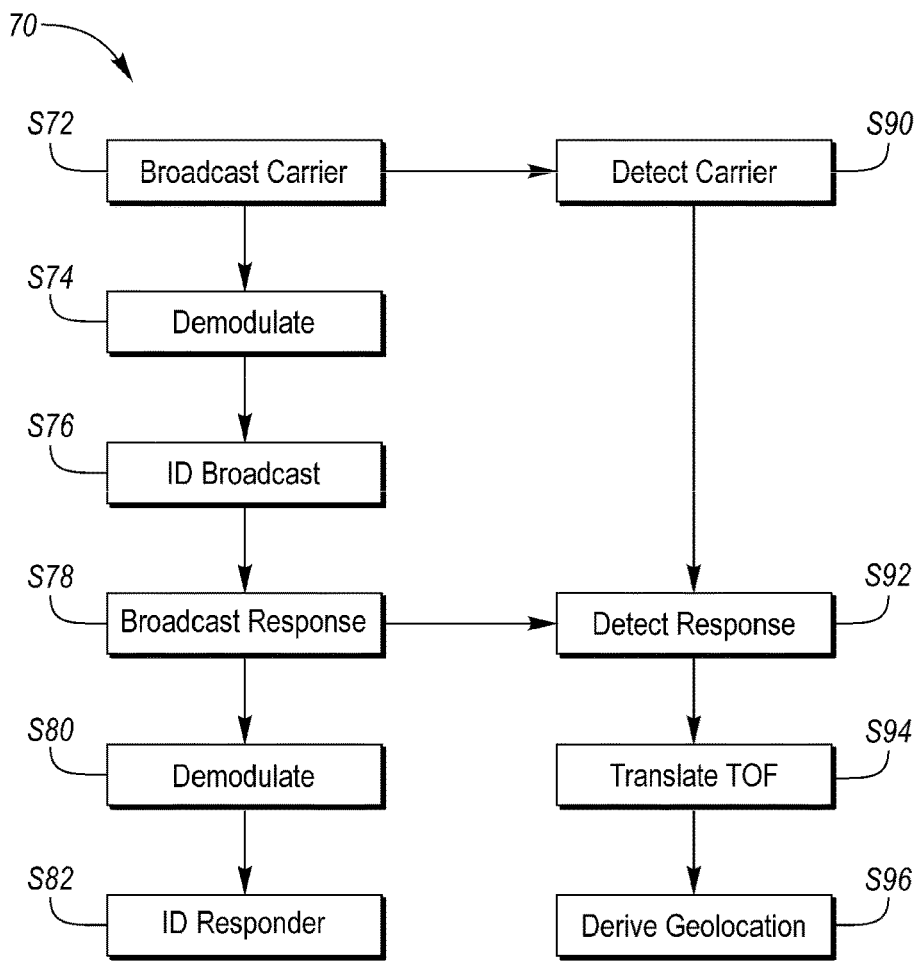
FIG. 3

METHOD AND SYSTEM FOR DETERMINING A GEOGRAPHICAL LOCATION OF AN UNMANNED AERIAL VEHICLE FLOWN IN PROXIMITY TO A POWER GRID

CROSS-REFERENCE TO RELATED PATENT APPLICATION(S)

This patent application claims the benefit of and priority to U.S. Provisional Application Ser. No. 62/536,501, filed on Jul. 25, 2017, the entire contents of which are hereby incorporated by reference.

STATEMENT REGARDING FEDERALLY SPONSORED RESEARCH OR DEVELOPMENT

The invention described herein was made in the performance of work under a NASA contract and by an employee of the United States Government and is subject to the provisions of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE INVENTION

Electrically-powered rotary or fixed-wing drones and other modern unmanned aerial vehicles (UAVs) provide exceptional maneuverability and stability, as well as extended dwell times and operating ranges. Collectively, these capabilities enable UAV-based inspection of difficult-to-reach power equipment, such as high-voltage transmission lines, transmission towers, transformers, and associated structure. For example, a UAV that is equipped with single-spectrum or multi-spectral cameras and/or band-specific point sensors may be used for locating existing or impending electrical arcing faults. In this manner, UAVs can facilitate inspection and repair of transmission lines and associated power equipment.

In order to determine its own geographical location ("geolocation") while in flight, a UAV platform typically relies on signal transmission from a navigation system, e.g., the Global Positioning System (GPS), an inertial measurement unit system (IMU), and/or an image recognition system. Of these example navigation systems, GPS tends to suffer from multi-path affects when used in proximity to metallic structures, which in turn is ubiquitous in modern transmission line infrastructure. GPS positional accuracy may be compromised by satellite losses due to horizon blockage, i.e., the "stadium effect", from electromagnetic interference, or from a loss of signal transmission from the orbiting constellation of GPS satellites. The level of geolocation accuracy typically available using image recognition systems tend to suffer from lighting changes caused, for example, by changing time of day and weather conditions, as well as from seasonal changes in foliage, snow cover, and precipitation. Inertial systems suffer from a phenomenon known as positional drift, which occurs on the order of minutes for compact inertial systems. A need therefore exists for reliable, fault-tolerant methods of UAV geolocation.

SUMMARY OF THE INVENTION

A method is disclosed herein that provides improved geolocation capabilities to an Unmanned Aerial Vehicle (UAV). The present method may be situationally triggered by an unanticipated loss of primary onboard geolocation capabilities while the UAV is in flight. For example, the UAV may fly below the tree line, between peaks of a mountain range, near tall buildings, or in close proximity to other natural or manmade obstructions that would tend to interfere with line-of-sight communication with the orbiting constellation of GPS satellites. Loss of primary geolocation capabilities may therefore result in use of the disclosed method, particularly when the UAV is flown in proximity to power transmission lines of a power grid.

Modern transmission lines are optimized for 50 to 60 Hertz (Hz) waveforms. However, power transmission lines ("powerlines") are suitable for propagation of waveforms having much higher frequencies. As a result, the conductors embodying modern powerlines are capable of transmitting communications signals that, in accordance with the present disclosure, could be used for UAV geolocation. Indeed, frequencies in the 100 kHz range may be used for diagnostic purposes in contemporary power grids. Such signals are used to "ping" and thereby verify proper operation of interconnected grid nodes, i.e., fixed transmission line infrastructure such as power generating stations, towers, and substations, as well as to configure the power grid, for instance by automatically opening or closing circuit breakers. The present method is enabled by configuring the UAV and the grid nodes of the power grid in the manner described below.

In a particular embodiment, the method includes detecting, via a transceiver of the UAV, a carrier signal that is transmitted by or from a first grid node of the power grid. The carrier signal identifies a fixed geolocation of the first grid node. The method in this embodiment also includes using the transceiver to detect a response signal transmitted by a second grid node in response to the carrier signal, with the response signal identifying a fixed geolocation of the second grid node. Additionally, a processor is used to calculate time-of-flight of the carrier signal using the detected response signal, and to derive the geolocation of the UAV as a function of the calculated time-of-flight. The processor thereafter controls operations of the UAV 18 using the derived geolocation.

The method may include modulating the carrier signal via the first grid node so as to form a modulated carrier signal, and then transmitting the modulated carrier signal to the second grid node at a frequency of at least 50 Hz. The frequency of the modulated carrier signal may exceed 100 kHz or 1 MHz in other example embodiments.

Determining the time-of-flight of the carrier signal may include referencing a lookup table from memory of the UAV. In some embodiments, the lookup table may be referenced or indexed by time-of-arrival-of the modulated carrier signal and the response signal at the transceiver.

Optionally, the carrier and response signals may respectively include a timestamp indicating time-of-transmission of the carrier signal and response signal, respectively. In such an embodiment, deriving the geolocation of the UAV may include subtracting the time-of-transmission of the response signal from the time-of-transmission of the carrier signal.

The transceiver and processor may be collocated with the UAV in some embodiments, with the processor located remotely from the UAV in other embodiments.

The method may include detecting a loss of a primary geolocation capability aboard the UAV, and then deriving the geolocation of the UAV using the calculated time-of-flight in response to the loss of the primary geolocation capability. Such an embodiment allows a primary geolocation capability, e.g., GPS, to be relied on unless such capability is lost, with the disclosed powerline-based geolocation method situationally operating in an emergency backup role.

A related system is also disclosed for determining the geolocation of a UAV flown in proximity to a power grid. The system may include a transceiver and a processor. The transceiver detects a carrier signal transmitted by a first grid node of the power grid having a fixed geolocation, with the carrier signal including a timestamp and identifying the fixed geolocation of the first grid node. The processor, which is electrically and/or communicatively connected to the transceiver, is programmed with a signal propagation speed of the carrier signal, and is configured to detect the carrier signal via the transceiver, and then translate a time-of-flight of the carrier signal from the first grid node to a predetermined position on or along the power grid as a corresponding distance of travel of the carrier signal. The processor also derives the geolocation of the UAV using the corresponding distance of travel of the carrier signal, and thereafter controls flight operations of the UAV using the geolocation of the UAV. The predetermined position on or along the power grid may be a position or point on the UAV, or it may be a second grid node having a fixed geolocation.

In another embodiment, a method for determining geolocation of a UAV flown in proximity to a power grid includes transmitting a carrier signal via a grid node of the power grid, with the grid node having a fixed geolocation. The carrier signal is timestamped and identifies the fixed geolocation of the grid node. The method includes detecting the carrier signal via a transceiver of the UAV, and also translating a time-of-flight of the carrier signal from the grid node to the UAV, via a processor, to thereby determine a corresponding distance of travel of the carrier signal. As part of this embodiment, the processor derives the geolocation of the UAV using the corresponding distance of travel of the carrier signal, and thereafter controls flight operations of the UAV using the derived geolocation.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE SEVERAL VIEWS OF THE DRAWINGS

FIG. 2 is a schematic plan view illustration of an example UAV equipped to execute UAV-specific portions of the disclosed geolocation method.

FIG. 2A is a schematic illustration of an example controller usable as part of the UAV shown in FIG. 2.

FIG. 3 is a flowchart describing an example embodiment of the powerline-based geolocation method described herein.

Figure 1:
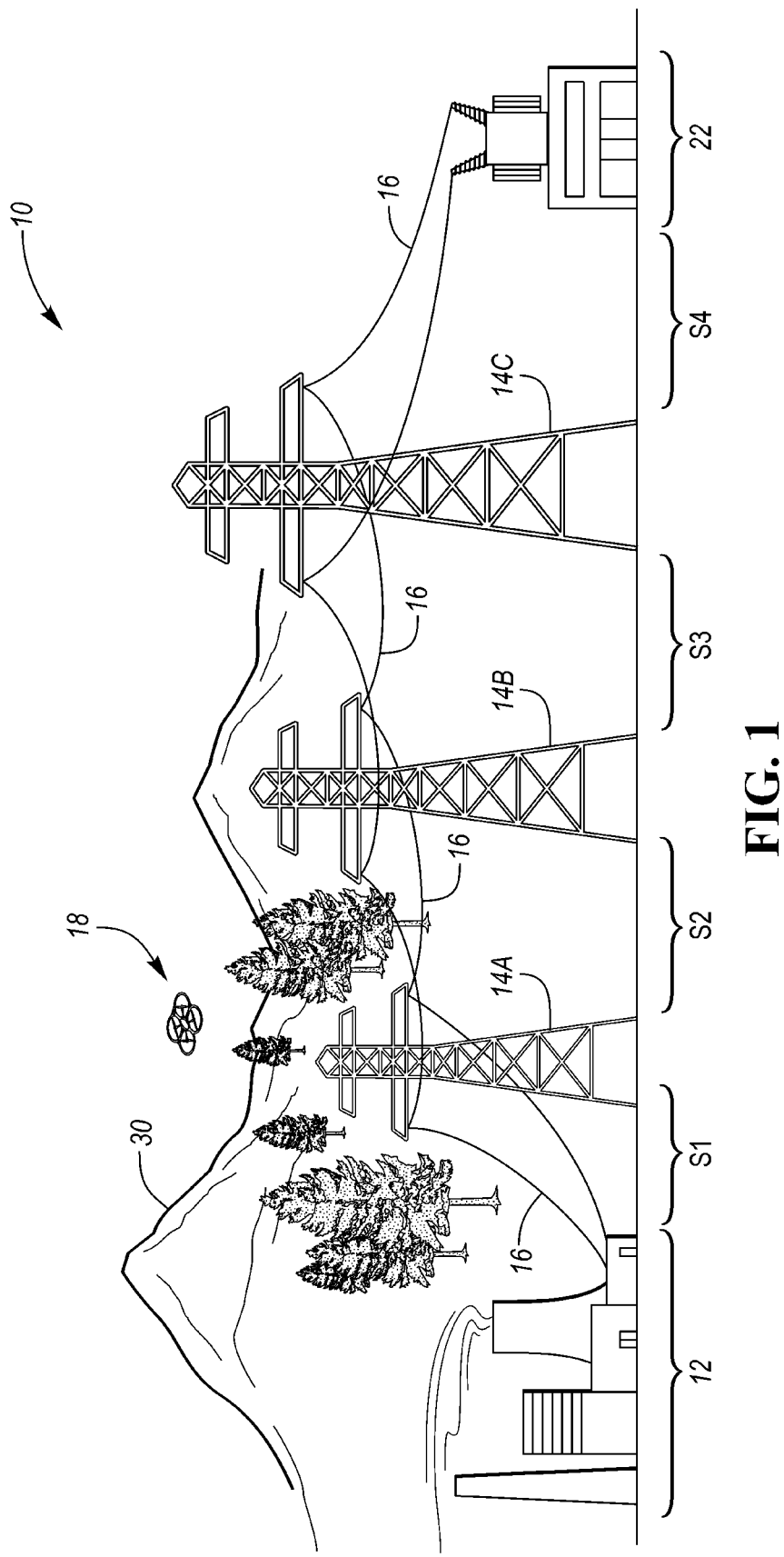
FIG. 1 is a schematic illustration of an example power grid and an unmanned aerial vehicle (UAV) configured with powerline-based geolocation capabilities as set forth herein.

The present disclosure is susceptible to modifications and alternative forms, with representative embodiments shown by way of example in the drawings and described in detail below. However, inventive aspects of this disclosure are not limited to the particular forms disclosed. Rather, the present disclosure is intended to cover modifications, equivalents, combinations, and alternatives falling within the scope of the disclosure as defined by the appended claims.

For purposes of description herein, the terms "upper," "lower," "right," "left," "rear," "front," "vertical," "horizontal," and derivatives thereof shall relate to the invention as oriented in FIG. 1. However, the invention may assume various alternative orientations and step sequences, except where expressly specified to the contrary. The specific devices and processes illustrated in the attached drawings and described in the following specification are exemplary embodiments of inventive concepts defined in the appended claims. Hence, specific dimensions and/or other physical characteristics relating to the particular embodiments disclosed herein are not to be considered as limiting, unless the claims expressly state otherwise. Moreover, words of approximation such as "about," "almost," "substantially," "approximately," and the like can be used herein in the sense of "at, near, or nearly at," or "within 3-5% of," or "within acceptable manufacturing tolerances," or logical combinations thereof.

As depicted in FIG. 1, an example power grid 10 forms a system that includes stationary, i.e., fixed, grid nodes 12 and 22. The grid nodes 12 and 22 are electrically connected to each other via power transmission lines 16, hereinafter referred to as powerlines 16, embodied as lengths of electrically-conductive cable supported by and extending between interspaced transmission towers 14A, 14B, and 14C. The grid nodes 12 and 22, which are depicted as a representative power generation station and substation, respectively, may be variously embodied as any fixed/stationary infrastructure element used within the power grid 10. For instance, the grid nodes 12 and 22 may encompass signal transceiver sites, buildings, and/or one or more of the transmission towers 14A, 14B, and/or 14C. Thus, each of the grid nodes 12 and 22 has a known predetermined geolocation, with the term "geolocation" as used herein referring to the geographic location of the UAV 18 in terms of approximate latitude and longitude coordinates thereof.

An unmanned aerial vehicle (UAV) 18 may be flown in proximity to the power grid 10 for the purpose of monitoring operation of the power grid 10 and/or when performing other flight operations in proximity to the power grid 10. A non-limiting example embodiment of the UAV 18 is described in further detail below with reference to FIGS. 2 and 2A. The power grid 10 and UAV 18 are collectively configured to execute instructions embodying a method 70 (see FIG. 3) in which the UAV 18 selectively determines its own geolocation by interfacing with signal transmission capabilities of the power grid 10. The identity of the grid nodes 12 and 22 may be expected to vary with the application. Therefore, the simplified layout illustrated in FIG. 1 is intended to be illustrative of the general concepts disclosed herein without limiting the grid nodes 12 and 22 to any particular structure.

The power grid 10 of FIG. 1 is arranged in distinct transmission segments S1, S2, S3, and S4. Transmission segment S1 is defined by grid node 12, the transmission tower 14A, and the powerline 16 extending between grid node 12 and the transmission tower 14A. Similarly, transmission segments S2, S3, and S4 are defined by their adjacent structure, e.g., transmission towers 14A and 14B form the transmission segment S2, transmission towers 14B and 14C together form the transmission segment S3, and transmission tower 14C forms the transmission segment S4 in conjunction with grid node 22. Although omitted from FIG. 1 for illustrative simplicity and clarity, associated power transmission structure and equipment such as transfer switches, transformers, capacitors, and insulators may be included in some or all of the transmission segments S1, S2, S3, and S4.

The representative UAV 18 is equipped in hardware and programmed in software to execute platform-specific portions of the method 70 of FIG. 3. As noted elsewhere above, the UAV 18 may be used to remotely monitor the structural integrity and performance of the power grid 10. For instance, the UAV 18 may be flown in close proximity to the power grid 10 next to the powerlines 16, i.e., within about 10 meters of the powerlines 16, so as to closely observe such equipment using a suite of onboard sensors 56 described below with reference to FIG. 2A. When used in this manner, the UAV 18 facilitates the early detection and localization of corona discharges and/or electrical arcs on the powerlines 16. As the heights of modern high-voltage transmission towers may be several hundred meters to well over two thousand meters, ongoing monitoring and inspection may be impracticable using ground-based equipment, work crews, or conventional aircraft, and thus the UAV 18 may have particular use in such environments.

In executing the above-noted functions, a UAV such as the UAV 18 of FIG. 1 may at times experience a loss of primary/onboard geolocation capability. For instance, the UAV 18 may fly between adjacent peaks of a mountain range 30. Buildings, trees, or other artificial or natural topographical features may interference with line-of-site communications of the UAV 18 with an orbiting constellation of GPS satellites. Inertial measurement unit systems or image recognition systems may likewise fail under various operating conditions. Regardless of the root cause of such a loss of primary geolocation capability, the UAV 18 may automatically default to execution of the present method 70 when in flying in close proximity to the power grid 10, such that geolocation capabilities provided by the present method 70 may be situationally triggered in real-time, e.g., while the UAV 18 is in active flight.

FIG. 2 shows the UAV 18 according to a non-limiting example embodiment that is usable within the context of the present disclosure. The UAV 18 may include a plurality of rotors 26 connected to a UAV body 24. Four rotors 26, i.e., rotating propeller blades, may be used as shown in a typical quad-copter configuration. More or fewer rotors 26 may be used in other embodiments. Alternatively, the UAV 18 may be embodied as a fixed-wing or a hybrid vertical takeoff and landing (VTOL) aircraft. When used, the rotors 26 may be powered via an onboard power supply (not shown) such as a battery pack and/or a fuel cell, or a gasoline, diesel, or biofuel supply when the rotors 26 are powered by a respective engine. Although omitted from FIG. 2, the UAV 18 in its various possible configurations may include additional components such as landing gear, gyroscopes, accelerometers, and altimeters, as well as necessary flight control systems, e.g., ailerons, stabilizers, elevators, winglets, flaps, and/or rudders.

The suite of sensors (S) 56 may be connected to the UAV body 24, with the sensors 56, shown as part of the controller 50 of FIG. 2A for simplicity, possibly connected at various locations of the UAV body 24 favorable to data collection, such as the undersides of the UAV body 24. The sensors 56 may include one or more cameras and/or point detectors controlled by a processor (P) 52 or other onboard or off-board/remotely positioned processing hardware during ongoing inspection of the example power grid 10 of FIG. 1. The sensors 56 may be configured to provide band-specific or broad/multi-spectrum cameras, such as ultraviolet, visible spectrum, and/or infrared cameras and associated image processing/feature recognition techniques. Alternatively, individual electromagnetic band-specific point detectors may be used to detect corona discharges or electrical arcs, as is known in the art.

Irrespective of the particular flight configuration of the UAV 18, a controller 50 mounted to the UAV body 24 may provide the requisite hardware and software for performing the method 70 of FIG. 3, and to thereby provide reliable geolocation capabilities to the UAV 18 as needed, e.g., situationally and temporarily in response to a loss of GPS communications or other primary geolocation capabilities. The controller 50 includes the processor 52 as well as memory (M) 54, on which is recorded UAV 18-specific instructions embodying the method 70, and a transceiver (T) 58. The transceiver 58 may be embodied as a radio receiver having a pickup antenna and a signal amplifier, as well as signal demodulation and digitization circuitry. The transceiver 58 therefore allows the UAV 18 to interface with the power grid 10 of FIG. 1 and thereby remotely detect the signals transmitted along the powerlines 16 in determining its geolocation, as will now be described with reference to FIG. 3.

Referring to FIG. 3, an example embodiment of the method 70 commences with step S72 with a first node, e.g., the grid node 12 of FIG. 1, broadcasting a carrier signal at a predetermined frequency. A typical form of power line carrier communication is a signal sequence referred to as the carrier blocking function. A transmitting station, in this instance grid node 12 operating as a first grid node, may first modulate the carrier signal using, for example, frequency shift keying (FSK) or other suitable modulation techniques. The grid node 12 then broadcasts the modulated carrier signal at a predetermined frequency onto the powerline 16, with the predetermined frequency ranging from 50-60 Hz in some embodiments, to about 100 kHz or greater than 1 MHz in other embodiments. The method 70 then proceeds to step S74. At the same time, the method 70 proceeds to step S90 and concurrently executes steps S92-S96 for geolocation as described separately below.

At step S74, a receiving station located on the power grid 10 of FIG. 1, which in the illustrative embodiment is the grid node 22 operating as a second grid node, or which may be the UAV 18 itself in an alternative embodiment as set forth below, receives the modulated carrier signal from the transmitting node, here grid node 12. The receiving station, i.e., grid node 22 or the UAV 18, then demodulates the carrier signal into a corresponding digital square wave pulse train. The method 70 then proceeds to step S76.

Step S76 includes identifying the geolocation of the transmitting node, i.e., grid node 12 in this example, using the demodulated pulse train. That is, with the fixed geolocation of the transmitting node encoded in the carrier signal, subsequent demodulation by the receiving node results in extraction of the fixed geolocation information. The method 70 thereafter proceeds to step S78.

Step 78 includes broadcasting, via the receiving node/grid node 22 when using communications between two fixed nodes, a response signal in a manner similar to the approach described above for step S72. The response signal effectively encodes the fixed geolocation of the responding node, in this case grid node 22 of FIG. 1. The method 70 then proceeds to step S80.

At step S80, grid node 12, now the receiving node, demodulates the response signal from grid node 22 and thereby identifies the fixed geolocation of the responding node. Steps S72-S82 collectively describe a typical power line carrier communication process. Using this or a similar approach, a master station is able relay the identity of all responding stations located anywhere in the power grid 10 of FIG. 1.

With respect to steps S90-S96, grid nodes 12 and 22 of FIG. 1 are interconnected by the powerlines 16. Time-of-flight of an electrical signal traveling between the grid nodes 12 and 22 is likewise a determinable quantity, with velocity of signal propagation along the powerlines 16 being known. That is, the velocity of propagation is less than or equal to the speed of light, and is a function of the geometry and construction of the powerlines 16 and the dielectric permittivity of the surrounding medium, e.g., air at standard temperature and pressure. Thus, such information may be recorded in memory 54 of the controller 50 shown in FIG. 2A and used as needed by the processor 52. Similarly, the time-of-flight of an electrical signal traveling from grid node 12 to grid node 22 is a determinable quantity. Thus, the UAV 18 may use these known properties and relationships to derive its geolocation as set forth below.

The transceiver 58 and processor 52 of FIG. 2A, which are used to sense the signal transmissions described above with reference to steps S72-S82, have the information needed to determine the geolocation of the UAV 18 along the transmission segments S1, S2, S3, and S4 of FIG. 1. Specifically, the difference between a time-of-arrival of the transmitted signals from grid node 12 and a time-of-arrival of such signals from grid node 22 are unique to the position of the transceiver 58 along the transmission segment S1, S2, S3, and S4. By referencing a lookup table stored in memory 54 of FIG. 2A, the UAV 18 may translate the differential time-of-flight into a corresponding distance given the known fixed geographic positions of grid nodes 12 and 22, or other transmitting "probe" and "responder" stations within the power grid 10. Step S90 of method 70, therefore, entails detecting the carrier signal from step S72, e.g., from grid node 12, and at step S92 detecting the corresponding response signal from grid node 22 as was previously described with reference to step S78.

At step S94, the UAV 18 translates the time-of-flight into a distance, e.g., using the lookup table or by direct calculation. The method 100 then proceeds to step S96.

At step S96, the UAV 18 derives its geolocation from the distance determined at step S94, such as by adding the distance from step S94 to the known geolocation of grid node 12. The processor 52 thereafter controls flight and/or data collection operations of the UAV 18 using the derived geolocation.

The above-described method 70 may also be used for geolocation of the UAV 18 using a single-ended time-of-flight measurement. That is, rather than using a second fixed node, the UAV 18 itself may be used as the receiving node or location. A suitable probe station such as grid node 12 transmits a probe signal, in a modulated form, as a carrier signal. The carrier signal contains the identity of the grid node 12, i.e., identifying features including its fixed geolocation, and a timestamp referenced to a standard time signal. The timestamp thus identifies a specific time-of-transmission of the probe/carrier signal. The transceiver 58 shown in FIG. 2A has access to the same standard time signal, either by radio reception or by internal countdown from a previous sampling of the standard time signal. The transceiver 58 demodulates the probe signal from the grid node 12 and the corresponding timestamp. The UAV 18, using a lookup table including the known spatial location/fixed geolocation of the grid node 12 and the known signal propagation velocity of the carrier signal along a signal transmission path, translates the time-of-flight into a corresponding distance along the transmission line from the grid node 12. Deriving the geolocation of the UAV 18 in such an embodiment may include subtracting the time-of-transmission of the carrier signal, which is identified in the timestamp, from the time-of-receipt of the carrier signal by the UAV 18 and/or the transceiver 58. This entire process thus yields the current geolocation of the UAV 18.

Since time-of-flight is generally on the order of 1 nanosecond per foot (ns/ft), the time resolution must be sufficiently precise to yield a geolocation error within an acceptable location radius. For example, for a propagation velocity of 1 ns/ft, one microsecond of time resolution error corresponds to 1000 feet of position error. An additional timing precision consideration applies in differential time-of-flight measurements. Specifically, the variation in the response time to a probe signal by a responder station limits the spatial resolution of the geolocation determination by the geolocating transceiver 58.

The examples described above illustrate the method 70 of FIG. 3 making use of the existing application of carrier blocking, and thus of existing 50/60 Hz power transmission frequencies, without limiting applications to such frequencies. For instance, applications such as relay trip sensing and remote switching rely on a carrier signal at frequencies other than 50/60 Hz. The method 70 described herein may make use of such carrier signals for the purpose of geolocation. Additionally, a carrier signal or other signal with frequency content other than the 50/60 Hz power transmission frequency, and possibly at frequencies of 1 MHz or higher, may be optionally injected into a transmission line at predetermined georeferenced points for the purpose of navigation.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for determining a geographical location (geolocation) of an unmanned aerial vehicle (UAV) flown in proximity to a power grid having fixed first and second grid nodes interconnected via power transmission lines, the method comprising:
   detecting, via a receiver aboard the UAV, a carrier signal that is transmitted over the power transmission lines by the first grid node of the power grid, the carrier signal identifying a fixed geolocation of the first grid node;
   detecting, via the receiver, a response signal transmitted over the power transmission lines from the second grid node of the power grid, the response signal identifying a fixed geolocation of the second grid node;
   calculating, via a processor, a time-of-flight of the carrier signal using the response signal;
   deriving the geolocation of the UAV using the calculated time-of-flight; and
   controlling flight operations of the UAV using the derived geolocation.

2. The method of claim 1, wherein the carrier signal transmitted over the power transmission lines to the second grid node occurs at a frequency of at least 50 Hz.

3. The method of claim 2, wherein the frequency exceeds 100 kHz.

4. The method of claim 1, wherein determining the time-of-flight includes referencing a lookup table from memory of the UAV.

5. The method of claim 4, wherein the lookup table is indexed by a time-of-arrival of the modulated carrier signal at the receiver and a time-of-arrival of the response signal at the transceiver.

6. The method of claim 4, wherein the carrier signal and the response signal respectively include a time stamp indicating a time-of-transmission of the carrier signal and response signal, respectively, and wherein deriving the geolocation of the UAV includes subtracting the time-of-transmission of the response signal from the time-of-transmission of the carrier signal.

7. The method of claim 1, wherein the receiver comprises a transceiver, and the receiver and the processor are co-located with the UAV.

8. The method of claim 1, further comprising:
detecting a loss of a primary geolocation capability of the UAV; and
deriving the geolocation of the IAV using the calculated time-of-flight responsive to the loss of the primary geolocation capability of the UAV.

9. A system for determining a geographical location (geolocation) of an unmanned aerial vehicle (UAV) flown in proximity to a power grid having a first grid node with a fixed geolocation, the first grid node connected to at least one additional grid node via power transmission lines, the system comprising:
a receiver configured to detect a carrier signal transmitted by the first grid node of the power grid over the power transmission lines, wherein the carrier signal identifies a timestamp and identifies the fixed geolocation of the first grid node; and
a processor coupled to the receiver, programmed with a signal propagation speed of the carrier signal, and configured to:
detect the carrier signal via the receiver;
translate a time-of-flight of the carrier signal from the grid node to a predetermined position on or along the power grid, using the signal propagation speed, as a corresponding distance of travel of the carrier signal;
derive the geolocation of the UAV using the corresponding distance of travel of the carrier signal; and
control flight operations of the UAV using the geolocation of the UAV.

10. The system of claim 9, wherein the predetermined position on or along the power grid is a position of the UAV.

11. The system of claim 9, wherein the at least one additional grid node includes a second grid node having a fixed geolocation, and wherein the predetermined position on or along the power grid is a position of the second grid node having the fixed geolocation.

12. The system of claim 11, wherein the processor is further configured to detect a response signal transmitted by the second grid node over the power transmission lines in response to receipt of the carrier signal by the second grid node, the response signal identifying the fixed geolocation of the second grid node, and wherein the processor is configured to calculate the time-of-flight of the carrier signal using the response signal.

13. The system of claim 12, wherein the carrier signal and the response signal respectively include a timestamp indicating a time-of-transmission of the carrier signal and response signal, respectively, and wherein the processor is configured to derive the geolocation of the UAV by subtracting the time-of-transmission of the response signal from the time-of-transmission of the carrier signal.

14. The system of claim 12, wherein the processor is configured to determine the time-of-flight of the carrier signal by referencing a lookup table stored in memory of the UAV, the lookup table being indexed by a respective time-of-arrival at the transceiver of the carrier signal and the response signal.

15. The system of claim 9, further comprising the first grid node, wherein the first grid node is configured to modulate the carrier signal, and to thereafter transmit the carrier signal over the power transmission lines to a second grid node at a frequency of at least 50 Hz.

16. The system of claim 9, wherein the processor is configured to detect a loss of a primary geolocation capability of the UAV, and to derive the geolocation of the UAV using the calculated time-of-flight responsive to detection of the loss of the primary geolocation capability.

17. A method for determining a geographical location (geolocation) of an unmanned aerial vehicle (UAV) flown within about 10 meters of a power grid, the power grid having multiple grid nodes connected to each other by power transmission lines, the method comprising:
in response to a loss of a primary/onboard geolocation capability of the UAV, transmitting a carrier signal over the power transmission lines via a first grid node of the multiple grid nodes of the power grid, the first grid node having a fixed geolocation, wherein the carrier signal is timestamped and identifies the fixed geolocation of the grid node;
detecting the carrier signal via a receiver of the UAV;
translating a time-of-flight of the carrier signal from the grid node to the UAV, via a processor, to thereby determine a corresponding distance of travel of the carrier signal along the power transmission lines;
deriving the geolocation of the UAV using the corresponding distance of travel of the carrier signal; and
controlling flight operations of the UAV using the geolocation of the UAV until the primary/onboard geolocation capability is restored.

18. The method of claim 17, wherein translating a time-of-flight of the carrier signal includes referencing a lookup table containing the fixed geolocation of the grid node and a known propagation velocity of the carrier signal.

19. The method of claim 17, wherein the deriving the geolocation of the UAV includes subtracting a time-of-transmission of the carrier signal by the grid node from a time-of-receipt of the carrier signal by the receiver.

20. The system of claim 9, wherein the receiver comprises a transceiver.

* * * * *